US011433300B2

(12) United States Patent
Kolen et al.

(10) Patent No.: US 11,433,300 B2
(45) Date of Patent: Sep. 6, 2022

(54) REQUEST DISTRIBUTION SYSTEM

(71) Applicant: Electronic Arts Inc., Redwood City, CA (US)

(72) Inventors: John Kolen, Foster City, CA (US); Harold Henry Chaput, Belmont, CA (US); Navid Aghdaie, San Jose, CA (US); Kazi Atif-Uz Zaman, Foster City, CA (US); Kenneth Alan Moss, Redwood City, CA (US)

(73) Assignee: ELECTRONIC ARTS INC., Redwood City, CA (US)

( * ) Notice: Subject to any disclaimer, the term of this patent is extended or adjusted under 35 U.S.C. 154(b) by 0 days.

(21) Appl. No.: 16/509,424

(22) Filed: Jul. 11, 2019

(65) Prior Publication Data

US 2021/0008448 A1    Jan. 14, 2021

(51) Int. Cl.
*A63F 13/355* (2014.01)
*G07F 17/32* (2006.01)
*G06N 20/00* (2019.01)
*A63F 13/71* (2014.01)

(52) U.S. Cl.
CPC ............ *A63F 13/355* (2014.09); *A63F 13/71* (2014.09); *G06N 20/00* (2019.01); *G07F 17/3272* (2013.01)

(58) Field of Classification Search
CPC ....... A63F 13/355; A63F 13/71; G06N 20/00; G07F 17/3272; G07F 17/3262; G07F 17/3225; G07F 17/3258; G07F 17/329; G07F 17/3295; G06Q 10/063; G06Q 10/06311; G06Q 10/063114; G06Q 10/06316; G06Q 10/0633; G06Q 10/06375; G06Q 10/0639; G06Q 10/06395

See application file for complete search history.

(56) References Cited

U.S. PATENT DOCUMENTS

| | | | |
|---|---|---|---|
| 6,834,285 B1 * | 12/2004 | Boris | G06Q 10/10 |
| 7,945,469 B2 * | 5/2011 | Cohen | G06Q 30/0601 |
| | | | 705/7.14 |
| 8,133,116 B1 * | 3/2012 | Kelly | A63F 13/537 |
| | | | 463/31 |
| 8,219,432 B1 * | 7/2012 | Bradley | G06Q 10/06311 |
| | | | 705/7.13 |
| 10,901,801 B2 * | 1/2021 | Lovelace | G06F 9/5083 |
| 2003/0061261 A1 * | 3/2003 | Greene | G06Q 10/06312 |
| | | | 718/104 |
| 2003/0093168 A1 * | 5/2003 | Nagaoka | 700/91 |
| 2006/0106675 A1 * | 5/2006 | Cohen | G06Q 30/0601 |
| | | | 705/26.1 |

(Continued)

*Primary Examiner* — James S. McClellan
*Assistant Examiner* — Ross A Williams
(74) *Attorney, Agent, or Firm* — Knobbe, Martens, Olson & Bear, LLP

(57) ABSTRACT

Embodiments of the systems and methods disclosed herein provide a request distribution system in which a request for resources may be executed by a plurality of workers. Upon receiving a request for resources from a user computing system, the request distribution system may select a subset of workers from the plurality of workers to execute the request within a time limit. Once the workers generate a plurality of outputs, each output associated with a quality level, the request distribution system may transmit the output associated with the highest quality level to the user computing system.

20 Claims, 7 Drawing Sheets

(56) References Cited

U.S. PATENT DOCUMENTS

| | | | |
|---|---|---|---|
| 2008/0005332 A1* | 1/2008 | Pande | G06F 9/4843 |
| | | | 709/226 |
| 2009/0292594 A1* | 11/2009 | Zaidi | G06Q 10/06 |
| | | | 705/7.42 |
| 2012/0029978 A1* | 2/2012 | Olding | G06Q 10/06398 |
| | | | 705/7.42 |
| 2012/0053992 A1* | 3/2012 | Erol | G06Q 30/0206 |
| | | | 705/7.35 |
| 2013/0111488 A1* | 5/2013 | Gatti | G06N 20/00 |
| | | | 718/103 |
| 2015/0356488 A1* | 12/2015 | Eden | G06Q 10/06395 |
| | | | 705/7.41 |
| 2019/0303779 A1* | 10/2019 | Van Briggle | G06F 11/3013 |
| 2019/0332508 A1* | 10/2019 | Goyal | G06F 11/0757 |
| 2020/0364083 A1* | 11/2020 | Walby | G06F 9/4881 |
| 2021/0008448 A1* | 1/2021 | Kolen | A63F 13/71 |

\* cited by examiner

REQUEST DISTRIBUTION SYSTEM

BACKGROUND OF THE INVENTION

Video games have increased in popularity and complexity in recent years. For example, there are some video games that seek to simulate the real world in as much detail as possible. There are some video games that seek to flood the user with high-octane action at every turn. There are even some video games that attempt to impart complex and coordinated actions to a multitude of non-playable characters simultaneously.

Additionally, video games may demand computing resources quickly to achieve a smooth and enjoyable gameplay session. Any calculations must be executed under strict time constraints in order to deliver desired content to a player in a timely fashion.

SUMMARY OF EMBODIMENTS

The systems, methods and devices of this disclosure each have several innovative aspects, no single one of which is solely responsible for the all of the desirable attributes disclosed herein. Details of one or more implementations of the subject matter described in this specification are set forth in the accompanying drawings and the description below.

One embodiment includes a request distribution system comprising: one or more data stores configured to store at least: one or more machine learning models configured to select workers for execution of a defined task; and one or more physical computer processors in communication with the one or more data stores, wherein the computer-executable instructions, when executed during runtime of a gameplay session of a game application, configure the one or more physical computer processors to: receive a first task associated with at least a first time threshold during runtime of the gameplay session the game application; identifying a first plurality of workers configured to execute the first task within the first time limit based, at least in part, on the one or more machine learning models, wherein each worker in the first subset of workers is configured to generate a different output in response to the first task, wherein each worker has a defined output quality level; distribute the first task to each worker in the first plurality of workers; by each worker in the first plurality of workers, generate an output specific to the associated with a first worker output quality level within the first time limit; at a first execution time, receive an indication to provide an output to the first task; select an output completed by one of the plurality of workers with the highest output quality level at the first execution time; and transmit the selected worker output to the game application during runtime of the gameplay session.

In some embodiments, at least one worker of the plurality of workers is configured to generate an output at or before the first time threshold. In some embodiments, at least one worker of the plurality of workers is configured to generate an output after the first time threshold. In some embodiments, the one or more data stores are configured to store a log file comprising a past request for computing resources, a past time limit associated with the past request, one or more workers from a plurality of workers associated with the past request, and a past worker output for each of the one or more workers. In some embodiments, the computer-executable instructions further configure the one or more processors to generate a first log file comprising the first request, the first plurality of workers configured to execute the first request within the first time threshold, and the first worker output for each worker in the first plurality of workers. In some embodiments, the machine learning models are trained based at least on the first log file. In some embodiments, the first execution time is based at least in part on a game state of the gameplay session. In some embodiments, the first execution time is at or after the first threshold time. In some embodiments, the first request comprises a second time threshold, wherein the second time threshold is longer than the first time threshold. In some embodiments, each of the first plurality of workers are heterogeneous workers.

Another embodiment includes request distribution method comprising: receiving a first task associated with at least a first time threshold during runtime of a gameplay session of a game application; identifying a first plurality of workers configured to execute the first task within the first time limit based, at least in part, on the one or more machine learning models, wherein each worker in the first subset of workers is configured to generate a different output in response to the first task, wherein each worker has a defined output quality level; distributing the first task to each worker in the first plurality of workers; by each worker in the first plurality of workers, generate an output specific to the associated with a first worker output quality level within the first time limit; at a first execution time, receiving an indication to provide an output to the first task; selecting an output completed by one of the plurality of workers associated with the highest output quality level at the first execution time; and transmitting the selected worker output to the game application during runtime of the gameplay session.

In some embodiments, the method comprises receiving a second task with a second time threshold; identifying a second plurality of workers configured to execute the second task, wherein the second type of task is different than the first type of task; and distributing the second task to each worker in the second plurality of workers. In some embodiments, the first task comprises a request for generation of at least one of an audio output, a video output, an image, text, or a calculation. In some embodiments, the first subset of workers comprises at least one worker that is configured to generate the output within the first time threshold. In some embodiments, the first plurality of workers is identified based at least partly on the first time threshold. In some embodiments, the first task is transmitted to each worker in the first subset of simultaneously. In some embodiments, each worker in the first plurality generates the output in parallel with each other worker in the first plurality. In some embodiments, the first time threshold is based at least in part on a complexity level associated with the first task. In some embodiments, the first execution time is based at least in part on a game state of the gameplay session. In some embodiments, the first execution time is at or after the first threshold time.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

DETAILED DESCRIPTION OF EMBODIMENTS

Introduction

Figure 1:
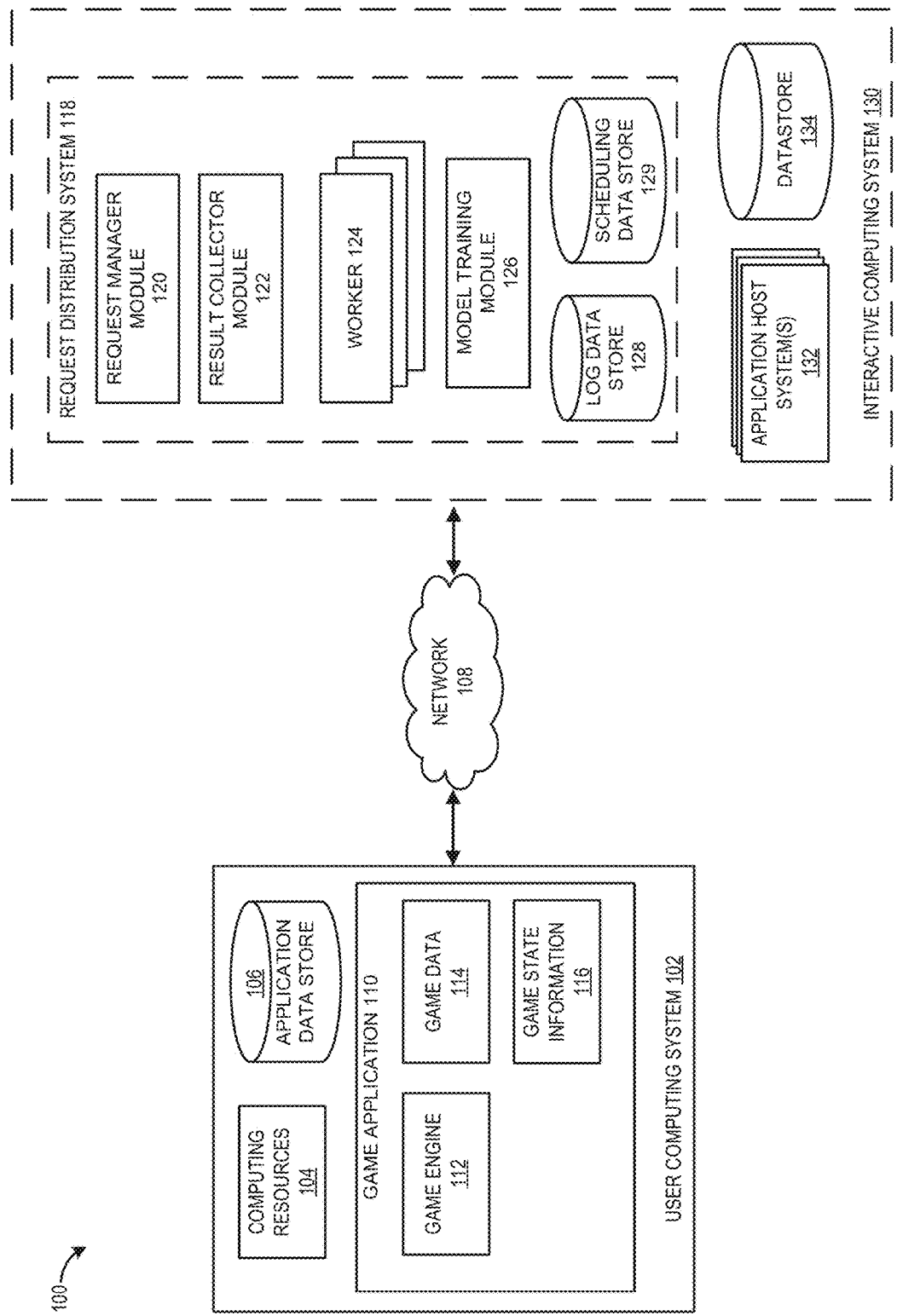
FIG. 1 illustrates an embodiment of a networked computing environment including a request distribution system.

Interactive game application systems invite a player to interact with a video game environment. The game application system provides game content to the user in response to the user's action within the game application. In some instances, the resource requirements for generating game content in real-time within the game application may make it difficult to quickly and efficiently generate all the game content given the complexities of character animations, music, object textures, dialogue options, player input, and other components of an interactive game application.

A system configured to distribute a request for computing resources may include modules and components that interoperate to efficiently process a request for resources during run-time of the game application. For example, a request distribution system may include modules configured to receive a request for computing resources, transmit the request to a number of workers among a plurality of workers, collect the outputs of each worker executing the request, and transmitting an output to a user computing system.

A request distribution system may also be configured to utilize machine learning models to determine which workers should execute a task received from a user computing device. The request distribution system may consider a variety of data, such as historical data, to train a model to accurately select workers configured to execute any given task.

Embodiments presented herein use machine learning algorithms in various implementations. Systems presented herein can use a parameter function or a prediction model to predict or select workers to execute a request. In some embodiments, historical data is fed into a machine learning system to generate a prediction model that predicts better selections of workers.

In the context of this application, the term "worker" can refer to computer code, computer applications, and/or one or more computer modules, that are configured with computer-executable instructions to perform one or more defined functions. In some embodiments, workers may have defined execution requirements, such as processing requirements, operating environments (e.g., Linux, iOS, etc.), and/or other execution requirements. Workers may be instantiated within virtual machine instances, such that a plurality of workers may be instantiated in the same virtual machine instance (e.g., workers that have compatible execution requirements) and/or individual workers may be instantiated in separate virtual machine instances. Workers may be homogenous or heterogeneous.

Homogenous workers may be able to perform the same set of functions related to a specific task. For example, a worker that is configured to render a frame, may be configured to render the frame at different resolutions based on the task instructions. For example, for two homogenous workers, a first worker may render a frame at 1080p and a second worker may render the frame at 720p, or visa-versa.

Heterogeneous workers may be configured to perform a different set of functions related to the same task. Heterogeneous workers may have different execution requirements and execute a task using a completely different set of functions. For example, in a request associated with an audio segment, a first worker may generate the audio segment via a sample-based MIDI synthesizer (e.g., FluidSynth, Kontakt, and the like.), a second worker may generate the audio segment using a machine learning model to generate waveforms (e.g., Wavenet), and a third worker may generate the audio segment by performing physical simulation to construct the waveform.

Overview of Request Distribution System

FIG. 1 illustrates an embodiment of a computing environment 100 for implementing a request distribution system. The environment 100 includes a network 108, a user computing system 102 and a request distribution system 118. To simplify discussion and not to limit the present disclosure, FIG. 1 illustrates only one user computing system 102 and one request distribution system 118, though multiple systems may be used. The user computing system 102 may communicate via a network 108 with the request distribution system 118. Although only one network 108 is illustrated, multiple distinct and/or distributed networks 108 may exist.

Computing System

The computing system 102 includes computing resources 104 and an application data store 106. The user computing system 102 may have varied local computing resources 104 such as central processing units and architectures, memory, mass storage, graphics processing units, communication network availability and bandwidth, and so forth. Further, the user computing system 102 may include any type of computing system. For example, the user computing system 102 may be any type of computing device, such as a desktop, laptop, video game platform/console, television set-top box, television (for example, Internet TVs), network-enabled kiosk, car-console device, computerized appliance, wearable device (for example, smart watches and glasses with computing functionality), and wireless mobile devices (for example, smart phones, PDAs, tablets, or the like), to name a few. A more detailed description of an embodiment of a computing system 102 is described below with respect to FIG. 7.

Game Application

The user computing system 102 can include a game application 110 installed thereon. The user computing system 102 can execute a game application 110 based on software code stored at least in part in the application data store 106. The game application 110 may also be referred to herein as a video game, a game, game code or a game program. A game application 110 should be understood to include software code that a computing device 102 can use to provide a game for a user to play. A game application 110 may include software code that informs a computing device 102 of processor instructions to execute, but may also include data used in the playing of the game, such as data relating to game simulation, rendering, animation, and other game data. In the illustrated embodiment, the game application 110 includes a game engine 112, game data 114, and game state data 116. When executed, the game application 110 is configured to generate a virtual environment for a user to interface with the game application 110.

In some embodiments, the user computing system 102 can execute machine readable instructions that are configured to execute the game application 110, such as a video game, stored on a data store on the user computing system (for example, application data store 106). The game application 110 may be stored or executed in a distributed environment using a client/server architecture. For example, the user computing system 102 may execute a portion of a game application 110 and the interactive computing system 130, or an application host system 132 of the interactive computing system 130 may execute another portion of the game application 110. For instance, the game application 110 may be a massively multiplayer online role-playing game (MMORPG) that includes a client portion executed by the user computing system 102 and a server portion executed by one or more application host systems 132. For the present discussion, the game application 110 can execute locally on the user computing system 102 or can execute as a distributed application that includes a portion that executes on the user computing system 102 and a portion that executes on at least one of the application host systems 132.

Game Engine

During operation, the game engine 112 executes the game logic, controls execution of the simulation of gameplay, and controls rendering within the game application 110. In some cases, the game engine 112 controls characters, the environment, execution of the gameplay, how the game progresses, or other aspects of gameplay based on one or more stored rule sets. For example, the game engine 112 can monitor gameplay and detect or determine a current runtime state of the game application 110. Based at least in part on the current runtime state of the game application, the game engine 112 applies a rule set to control the characters or the environment.

In some embodiments, the game engine 112 can include a simulation engine and a presentation engine. The simulation engine executes the game logic and controls execution of the gameplay simulation. The presentation engine controls execution of presentation of the gameplay and rendering of frames. In some embodiments, the game engine 112 can execute the functionality of the simulation engine and the presentation engine using different engines and/or processes within the game application.

The simulation engine can control execution of individual virtual components, virtual effects or virtual objects within the game application 110. The simulation engine can manage and determine character movement, character states, collision detection, derive desired motions for characters based on collisions, or the like. The simulation engine receives user inputs and determines character events, such as actions, collisions, runs, throws, attacks and other events appropriate for the game. The character events can be controlled by character movement streams that determine the appropriate motions the characters should make in response to events. The simulation engine can interface with a physics engine that can determine new poses for the characters. The physics engine can have as its inputs, the skeleton models of various characters, environmental settings, character states such as current poses (for example, positions of body parts expressed as positions, joint angles or other specifications), and velocities (linear or angular) of body parts and motions provided by a character movement module, which can be in the form of a set of force/torque vectors for some or all body parts. From this information, the physics engine generates new poses for the characters using rules of physics and those new poses can be used to update character states. The game device provides for user input to control aspects of the game according to rule sets.

The simulation engine can output graphical state data (e.g., game state data 114) that is used by presentation engine to generate and render frames within the game application 110. In some embodiments, each virtual object can be configured as a state stream process that is handled by the simulation engine. Each state stream process can generate graphical state data for the presentation engine. For example, the state stream processes can include emitters, lights, models, occluders, terrain, visual environments, and other virtual objects with the game application 110 that affect the state of the game.

The presentation engine can use the graphical state data to generate and render frames for output to a display within the game application 110. The presentation engine can to combine the virtual objects, such as virtual characters, animate objects, inanimate objects, background objects, lighting, reflection, and the like, in order to generate a full scene and a new frame for display. The presentation engine takes into account the surfaces, colors textures, and other parameters of the virtual objects. The presentation engine can then combine the virtual objects (for example, lighting within the virtual environment and virtual character images with inanimate and background objects) to generate and render a frame.

Game Data

The game data 114 can include rule sets, prerecorded motion capture poses/paths, environmental settings, environmental objects, constraints, skeleton models, route information, or other game application information.

Rule sets can be applied by the game engine 112 to control characters, the environment, execution of the gameplay, how the game progresses, or other aspects of gameplay. The rule sets can define the specific way in which players (for example, player characters or non-player characters) or the environment behaves or interacts within the video game. For example, the rules sets can correspond to difficulty levels (for example, easy, normal, hard, novice, expert) of a video game. As another example, the rule sets can control a number of resources available to a player, a number of challenges a player must face to progress through the video game, rules for scoring, possible inputs, actions, events, movement in response to inputs, or the like. Further still, for instance in sports-related video games, the rules set can control a degree of skill or ability of a particular virtual player, team, or coach, or can dictate how virtual entities react to particular in-game situations, such as a breakaway, a 3-on-1 attack, a 3-on-1 defense, or the like. In some cases, rule sets can function as a virtual entities' brain or artificial intelligence.

In some cases, the rule sets can be described using the concepts of agents, actions, runtime states, or environments. For example, an agent can be a virtual character in the video game, such as a player character (e.g., controlled by a user) or a non-player character (e.g., controlled by the game application), and an action can be a move from a set of all possible moves the agent can make. For example, a hockey player (the agent) can pass (action A) or shoot (action B) the puck, among other possible actions. A runtime state can be described as a concrete and immediate situation in which the agent finds itself. For example, the runtime state can be a specific place and moment, such as an instantaneous configuration that puts the agent in relation to other significant things like tools, obstacles, enemies or prizes. A virtual environment can be described as the virtual world through which the agent moves. In general, a rule or rule set can define an agent's way of behaving (for example, the agent's actions) at a given time, runtime state, and environment.

At least a portion of the game data 114 can be stored in the application data store 106. In some embodiments, a portion of the game data 114 may be received or stored remotely, such as in the data store 134. Game data may be received during runtime of the game application 110. For example, in some cases, one or more rule sets (for example, exploratory rules sets) can be received, stored, or applied during runtime of the game application 110.

Game State Information

During runtime of the game application 110, the game application 110 can collect or store game state data 118, which can include a game state, character states, environment states, scene object storage, route information, or information associated with a runtime state of the game application 110. For example, the game state data 118 can identify the state of the game application 110 at a specific point in time, such as a character position, character orientation, character action, game level attributes, and other information contributing to a state of the game application 110. The game state data can include simulation game state data and graphical game state data. The simulation game state data can include game state data that is used by the game engine 112 to execute the simulation of the game application 110. The graphical game state data can include game state data that is generated based on the simulation state data and is used to generate and render frames for output on a display.

Virtual Environment

As used herein, a virtual environment may include a simulated environment (for example, a virtual space) instanced on a user computing system 102, a server (for example, the interactive computing system 130) that is accessible by a client (for example, user computing system 102) located remotely from the server, to format a view of the virtual environment for display to a user of the client. The simulated environment may have a topography, express real-time interaction by the user, or include one or more objects positioned within the topography that are capable of locomotion within the topography. In some implementations, the topography may be a two-dimensional topography. In other instances, the topography may be a three-dimensional topography. In some implementations, the topography may be a single node. The topography may include dimensions of the virtual environment, or surface features of a surface or objects that are "native" to the virtual environment. In some implementations, the topography may describe a surface (for example, a ground surface) that runs through at least a substantial portion of the virtual environment. In some implementations, the topography may describe a volume with one or more bodies positioned therein (for example, a simulation of gravity-deprived space with one or more celestial bodies positioned therein). A virtual environment may include a virtual world, but this is not necessarily the case. For example, a virtual environment may include a game space that does not include one or more of the aspects generally associated with a virtual world (for example, gravity, a landscape, etc.). By way of illustration, the well-known game Tetris may be formed as a two-dimensional topography in which bodies (for example, the falling tetrominoes) move in accordance with predetermined parameters (for example, falling at a predetermined speed, and shifting horizontally or rotating based on user interaction).

The game instance of the video game 110 may include a simulated virtual environment, for example, a virtual environment that is accessible by users via clients (for example, user computing systems 102) that present the views of the virtual environment to a user. The virtual environment may have a topography, express ongoing real-time interaction by one or more users or include one or more objects positioned within the topography that are capable of locomotion within the topography. In some instances, the topography may include a two-dimensional topography. In other instances, the topography may include a three-dimensional topography. The topography may include dimensions of the space or surface features of a surface or objects that are "native" to the space. In some instances, the topography may describe a surface (for example, a ground surface) that runs through at least a substantial portion of the space. In some instances, the topography may describe a volume with one or more bodies positioned therein (for example, a simulation of gravity-deprived space with one or more celestial bodies positioned therein). The instance executed by the computer components may be synchronous, asynchronous, or semi-synchronous.

It should be understood the above description of the manner in which state of the virtual environment associated with the video game is not intended to be limiting. The game application 110 may be configured to express the virtual environment in a more limited, or richer, manner. For example, views determined for the video game representing the game state of the instance of the video game may be selected from a limited set of graphics depicting an occurrence in a given place within the video game. The views may include additional content (for example, text, audio, pre-stored video content, or other content) that describes particulars of the current state of the place, beyond the relatively generic graphics. For example, a view may include a generic battle graphic with a textual description of the opponents to be confronted. Other expressions of individual places within the video game are contemplated.

The game engine 112 generates game state data 118 that may be used locally within the game application 110 and may be transmitted to the interactive computing system 130 over network 108. The execution of the instance of the game application 110 may include determining a game state associated with the game application 110. The game state data 118 may facilitate presentation of views of the video game to the users on the user computing systems 102. The game state data 118 may include information defining the virtual environment in which the video game is played. The execution of the game engine is described in further detail herein.

The execution of the game instance may enable interaction by the users with the game application 110 or other users through the interactive computing system 130. The game application 110 may be configured to perform operations in the game instance in response to commands received over network 108 from user computing systems 102. In some embodiments, users may interact with elements in the video game or with each other through the video game.

Users may participate in the video game through client game applications 110 implemented on user computing systems 102 associated with the users. Within the game instance of the video game executed by the game engine 112, the users may participate by controlling one or more of an element in the virtual environment associated with the video game. The user-controlled elements may include avatars, user characters, virtual environment units (for example, troops), objects (for example, weapons, horses, vehicle and so on), simulated physical phenomena (for example, wind, rain, earthquakes, or other phenomena), or other user-controlled elements.

The user-controlled avatars may represent the users in the virtual environment. The user characters may include heroes, knights, commanders, leaders, generals or any other virtual environment entities that may possess strength, skills, abilities, magic powers, knowledge, or any other individualized attributes. The virtual environment units controlled by the user may include troops or any other game entities that may be trained, recruited, captured, or otherwise acquired by the users in groups or en-mass. The objects controlled by the users may include weapons, vehicles, projectiles, magic items, wardrobes, boots, armor, knapsacks, medicine, healing potion, or any other virtual items that may be employed by the users for interaction within the video game.

The user-controlled element(s) may move through and interact with the virtual environment (for example, user-virtual environment units in the virtual environment, non-user characters in the virtual environment, other objects in the virtual environment). The user controlled elements controlled by or associated with a given user may be created or customized by the given user. The user may have an "inventory" of virtual goods or currency that the user can use (for example, by manipulation of a user character or other user controlled element, or other items) within the virtual environment.

Controls of virtual elements in the video game may be exercised through commands input by a given user through user computing systems 102. The given user may interact with other users through communications exchanged within the virtual environment. Such communications may include one or more of textual chat, instant messages, private messages, voice communications, or other communications. Communications may be received and entered by the users via their respective user computing systems 102. Communications may be routed to and from the appropriate users through server(s) (for example, through application host system 132).

Execution or performance of the user action by the game engine 112 may produce changes to the game state, which may reflect progresses or results of the user actions. In some examples, state changes caused by the execution of the user actions may be recorded in the application data store 106 or data store 134 to facilitate persistency throughout the instance of the video game. In some examples, execution of the user actions may not produce persistent changes to the game state (for example, a user character jumping forward and backward successively may not produce any perceivable game state changes to other users).

A given user may input commands with specific parameters to undertake specific deeds, actions, functions, spheres of actions or any other types of interactions within the virtual environment. For example, the given user may input commands to construct, upgrade or demolish virtual buildings; harvest or gather virtual resources; heal virtual user-controlled elements, non-player entities or elements controlled by other users; train, march, transport, reinforce, reassign, recruit, or arrange troops; attack, manage, create, demolish or defend cities, realms, kingdoms, or any other virtual environment locations controlled by or associated with the users; craft or transport virtual items; interact with, compete against or along with non-player entities or virtual environment elements controlled by other users in combats; research technologies or skills; mine or prospect for virtual resources; complete missions, quests, or campaigns; exercise magic power or cast spells; or perform any other specific deeds, actions, functions, or sphere of actions within the virtual environment. In some examples, the given user may input commands to compete against elements in an environment within the virtual environment—for example, Player vs. Environment (PvE) activities. In some examples, the given user may input commands to compete against each other within the virtual environment—for example, Player vs. Player (PvP) activities.

The instance of the video game may include virtual entities automatically controlled in the instance of the video game. Such virtual entities may or may not be associated with any user. As such, the automatically controlled virtual entities may be generated or developed by artificial intelligence configured with the game application 110 or server(s) interactive computing system 130 by a provider, administrator, moderator, or any other entities related to the video game. These automatically controlled entities may evolve within the video game free from user controls and may interact with the entities controlled by or associated with the users, other automatically controlled virtual environment entities, as well as the topography of the virtual environment. Certain manifested traits may be associated with the automatically controlled entities in accordance with the artificial intelligence configured with server(s) (for example, application host system 132). As used herein, such automatically controlled virtual environment entities in the instance of the video game are referred to as "non-player entities."

In an online game, the instance of the video game may be persistent. That is, the video game may continue on whether or not individual users are currently logged in or participating in the video game. A user that logs out of the video game and then logs back in some time later may find the virtual environment or the video game has been changed through the interactions of other users with the video game during the time the user was logged out. These changes may include changes to the simulated physical space, changes in the user's inventory, changes in other users' inventories, changes experienced by non-user characters, or other changes.

Interactive Computing System

The interactive computing system 130 may include application host system(s) 132, a data store 134, and a request distribution system 118. The interactive computing system 130 may include one or more computing systems configured to execute a portion of the game application 110. The interactive computing system 130 may enable multiple users or computing systems to access a portion of the game application 110 executed or hosted by the interactive computing system 130. The interactive computing system 130 can have one or more game servers that are configured to host online video games. For example, the interactive computing system 130 may have one or more game servers that are configured to host an instanced (for example, a first person shooter multiplayer match) or a persistent virtual environment (for example, a multiplayer online roll playing game). The virtual environment may enable one or more users to interact with the environment and with each other in a synchronous or asynchronous manner. In some cases, multiple instances of the persistent virtual environment may be created or hosted by one or more game servers. A set of users may be assigned to or may access one instance of the virtual environment while another set of users may be assigned to or may access another instance of the virtual environment. In some embodiments, the interactive computing system 130 may execute a hosting system for executing various aspects of a game environment. For example, in one embodiment, the game application 110 may be a competitive game, such as a first person shooter or sports game, and the interactive computing system 130 can provide a dedicated hosting service (such as, through the game servers) for hosting multiplayer game instances or facilitate the creation of game instances hosted by user computing devices.

Request Distribution System

The request distribution system 118 may include one or more modules configured to execute processes and/or functions associated with the request distribution system. In certain embodiments the various modules of the request distribution system 118 may receive and process a request to provide content associated with game application 110.

Request Manager Module

The request distribution system 118 may include a request manager module 120. The request manager module 120 may enable a user computing system to efficiently execute processes requested or required by the game application 110. For example, in one embodiment, the game application 110 may monitor the location of a player character within the game environment and generate or render objects in the environment when the player character approaches particular locations in the environment. The request distribution system 118 may receive a request to process textures for an object in the environment as the player character approaches the location of the object. In some embodiments, the request manager module 120 may receive the request and distribute the request to workers that may execute the request within a certain time frame (e.g., 10 milliseconds). As will be discussed in more detail below, in some embodiments, the request manager module 120 may distribute the request to a plurality of workers based at least partly on collected information associated with previous requests and machine learning models. Each worker can be configured to generate a different output for the same request. For example, the request manager module 120 may distribute a request to process an image within 10 milliseconds to a first worker that is configured to generate the image at a first resolution and to a second worker that is configured to deliver the image at a second resolution. The workers can have different processing times and have different resource requirements for processing the request. The request manager module 120 may distribute the request to workers that may be unlikely to complete the task within the specified time frame. For example, the distribution request manager module 120 may distribute a request to process an image within 10 milliseconds to the second worker even though the second worker may have historically taken longer than 10 milliseconds to render an image.

Result Collector Module

The request distribution system 118 may comprise a result collector module 122. The result collector module 122 may be configured to receive outputs as soon as they are generated from the one or more workers 124 or may request outputs from the one or more workers 124 when a request is due. The result collector module 122 may receive outputs simultaneously or at different time intervals. For example, the result collector module 122 may receive a first output from a first worker and a second output from a second worker at the exact same time. In some embodiments, the result collector module 122 may receive the second output from the second worker after receiving the first output from the first worker. In some embodiments, the result collector module 122 may collect the various outputs and transmit the output associated with the highest quality to computing system 102. For example, the result collector module 122 may receive a low-quality rendering of an image from the first worker and may receive a medium-quality rendering of the same image from the second worker. The result collector module 122 may then transmit the medium-quality rendering to computing system 102 in response to the request originally received by the request distribution system 118. The result collector module 122 may wait to transmit the appropriate output until a request for the completed resource is received or may provide the request in accordance with a specified amount of time associated with the request. For example, if the original request is associated with a time limit of 100 milliseconds, the result collector module 122 may wait and collect outputs from the various workers for up to 100 milliseconds before transmitting a result back to the computing system 102.

Worker

Request distribution system 118 may comprise a plurality of workers 124 configured to execute tasks and requests distributed by the request manager module 122. The plurality of workers may be configured to execute different functions in response to the same task. For example, a first, second, and third worker may each receive the same request to generate a specific video file (e.g., the first 5 seconds of an in-game cut scene). However, the first worker may output a low-quality video file, the second worker may output a medium-quality video file, and the third worker may output a high-quality video file. As will be discussed in greater detail below, the workers that successfully complete their assigned task may transmit their outputs to the result collector module 122. In another example, in a request associated with an audio segment, a first worker may generate the audio segment via a sample-based MIDI synthesizer (e.g. FluidSynth, Kontakt, . . . ), a second worker could generate the audio segment using a machine learning model to generate waveforms (e.g. Wavenet), and a third worker could generate the audio segment by performing physical simulation to construct the waveform.

Model Training Module

In some embodiments, request distribution system 118 may utilize model training module 126 to train one or more machine learning models to determine which workers should receive a task from request manager module 120. In some embodiments, the model training module 126 may utilize log information stored in log data store 128 to train a machine learning model to determine an appropriate subset of workers for a given task and time limit. As will be discussed in greater detail in FIGS. 2 and 6, the model training module 126 may consider a variety of data, such as historical data, to train a model to accurately select workers configured to execute any given task.

Log Data Store

The request distribution system 118 may include a log data store 128. In some embodiments, log data store 128 may store information associated with previous requests that have been processed and completed by the request distribution system 118. For example, upon transmitting an output to computing system 102 in response to a request for computing resources, the request distribution system 118 may compile information comprising the request, the time limit associated with the request, the workers assigned to execute the task, and whether each worker successfully completed the task in a log file to be stored in log data store 128. For example, each log file could be represented as a multi-dimensional vector. The entries in log data store 128 may be utilized by model training module 126 to determine a subset of workers capable of executing any given request.

Scheduling Data Store

Request distribution system 118 may comprise a scheduling data store 129. In some embodiments, scheduling data store 129 may store machine learning models that may be utilized to allocate requests to a subset of workers. The scheduling data store may be updated periodically to ensure the models are reliably trained upon current information. For example, the scheduling data store may update whenever a task or request is successfully executed and the output successfully transmitted to the user computing system 102.

Network

The computing system 102 may communicate via a network 108 with the request distribution system 118. Although only one network 108 is illustrated, multiple distinct or distributed networks 108 may exist. The network 108 can include any type of communication network. For example, the network 108 can include one or more of a wide area network (WAN), a local area network (LAN), a cellular network, an ad hoc network, a satellite network, a wired network, a wireless network, and so forth. In some embodiments, the network 108 can include the Internet.

Data Flow Between System Components of Request Distribution System

Figure 2:
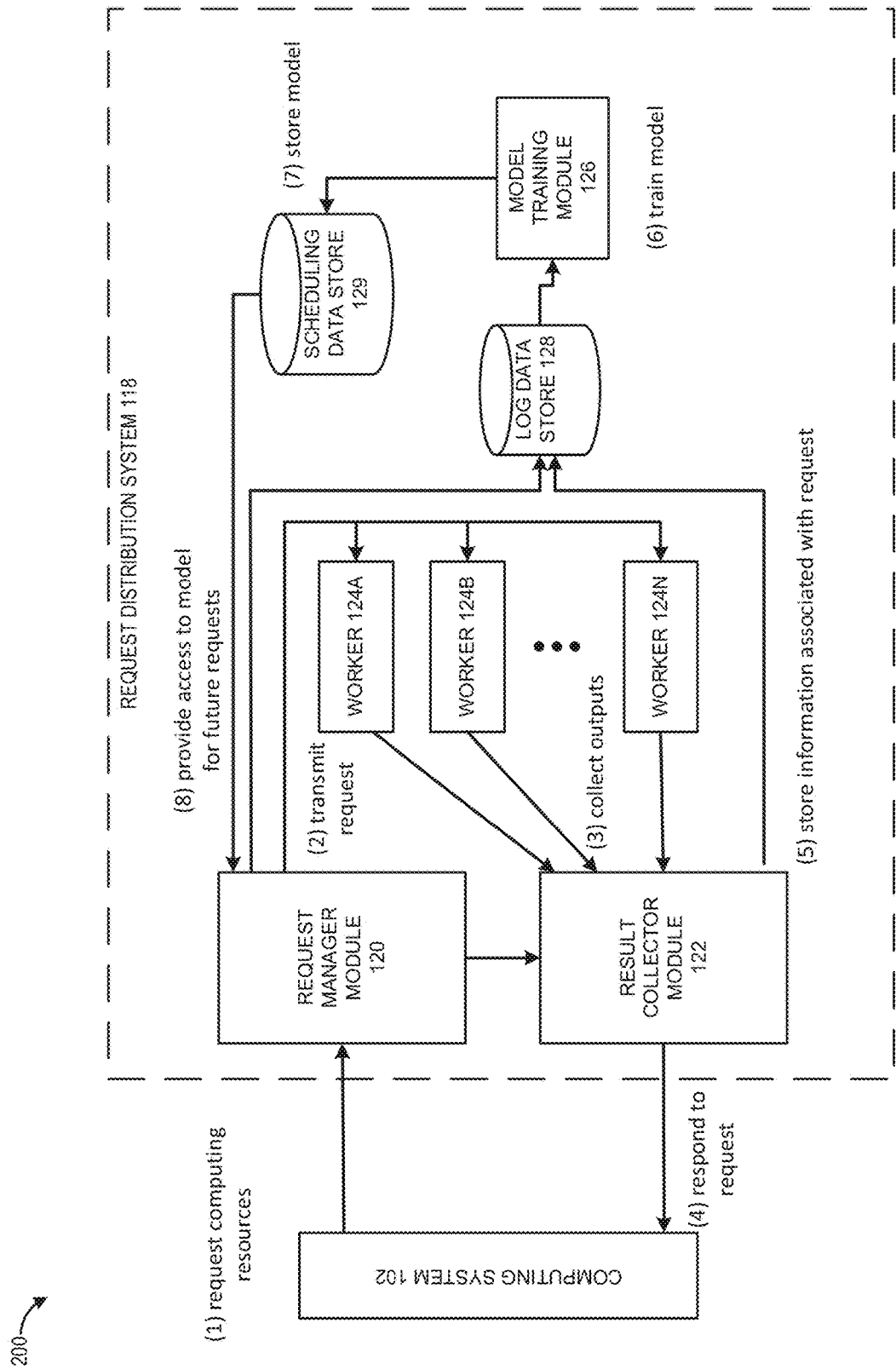
FIG. 2 illustrates an embodiment of a block diagram of interactions between various systems from FIG. 1 implementing a request distribution system.

FIG. 2 illustrates an embodiment 200 of a block diagram of interactions between the request distribution system 118 and a computing system 102. In some embodiments, computing system 102 may be an embodiment of a computing system 102. The computing system 102 is in communication with request distribution system 118 via network 108. The description generally refers to a request issued from the computing system 102, which is then fulfilled by request distribution system 118.

At (1), a computing system 102 can send a request to a request distribution system 118 requesting that a particular task be completed (e.g., a request to fetch or generate an audio segment). The request may be time-sensitive and require the request distribution system 118 to respond to the request within a predetermined time limit. For example, if the computing system 102 determines audio associated with combat effects (e.g., weapons firing, explosions, etc.) needs to be generated, the computing system 102 may request that the audio corresponding to the combat effects be generated and transmitted to the computing system 102 within 100 milliseconds during runtime of the game. In other embodiments, the local requestor 200 may request computing resources based at least partly on user input. For example, a player who fights a computer-controlled opponent may expect the computer-controlled opponent to react to the player's own actions during a gameplay session. In such a scenario, the computing system 102 may request the request distribution system 118 to calculate a reaction for the computer-controlled opponent to take in response to the player's button inputs or physical position in the video game environment.

At (2), the request manager module 120 may receive the request and transmit the request to a number of workers 124A through 124N. It will be appreciated that additional or fewer workers may be included in other embodiments. In some embodiments, each worker may receive the same request from request manager module 120 but may execute the task differently or perform different functions in order to achieve a different output. For example, worker 124A may be configured to perform a first function having first processing requirements and a first processing time in order to generate a first output. The first output may result in a quick low quality output (e.g., a video clip at 144p resolution). The second worker 124B may be configured to perform a second function having second processing requirements and a second processing time in order to generate a second output. The second output can take additional time to generate a higher quality (e.g., the same video clip but at 720p resolution). In some embodiments, the request manager module 120 may transmit the request to all available workers. However, in other embodiments, the request manager module 120 may allocate the requests to a subset of the number of workers based on time constraints. For example, if an audio clip is predicted to be needed within a predicted request timeframe, such as between 10 and 20 milliseconds of making the request, then the request manager module 120 may allocate the request to first worker 124A because it is configured to generate an output almost immediately but at a lower quality. The request to the first worker 124A can be a request for an output that is guaranteed to be delivered within the request timeframe. The request manager module 120 may allocate the request to one or more additional workers that may not necessarily provide the needed output by the minimum time in the request time period. For example, in addition to sending the request to first worker 124A, the request manager module 120 may transmit the request to worker 124B generate a medium-quality output even if the time to generate the output is greater than the minimum time in the request timeframe (e.g., 10 milliseconds).

In some embodiments, the request manager module 120 may predict which workers may successfully execute the task based at least partly on the application of trained machine learning models. The models may be trained using sample training data to initiate machine learning models and may utilize log information from actual requests to further hone the accuracy of the model's predictions. Generation of the machine learning models will be further discussed herein.

At (3), the various workers may transmit their respective outputs to result collector module 122. The outputs of the workers 124 may be transmitted as soon as they are complete or after receiving a request from the result collector module 122.

At (4), the request distribution system 118 may respond to the original request by transmitting an output to computing system 102. While result collector module 122 may collect a plurality of outputs associated with varying degrees of quality at (3), the result collector module 122 may ultimately select only one output to transmit to computing system 102. In some embodiments, the result collector module 122 may select the output with the highest quality and transmit the output associated with the highest quality to the computing system 102 at the time that the output is requested.

At (5), the request distribution system 118 may store information associated with the completed request in log data store 128. In some embodiments, log data store 128 may comprise information regarding the request itself, a time limit associated with the request, the identities and functionality of each worker assigned to complete the request, and whether each worker successfully completed the task within the time limit associated with the request. By storing such information in log data store 128, the request distribution system 118 may utilize such historical information to make appropriate allocations for future requests.

At (6), the model training module may utilize the historical information stored in log data store 128 to train one or more machine learning models. Such models may be used to accurately predict a subset of workers capable of executing a given task within a set time limit. The model training module 126 may retrain each model once a new request has been received and successfully executed. Generation and application of the machine learning model is described in further detail with respect to FIG. 6.

At (7), the trained models may be stored in scheduling data store 129, which may then be accessed at (8) by request manager module 120 in order to be used in future requests by the request manager module 120.

Process for Allocating Requests to Workers

Figure 3:
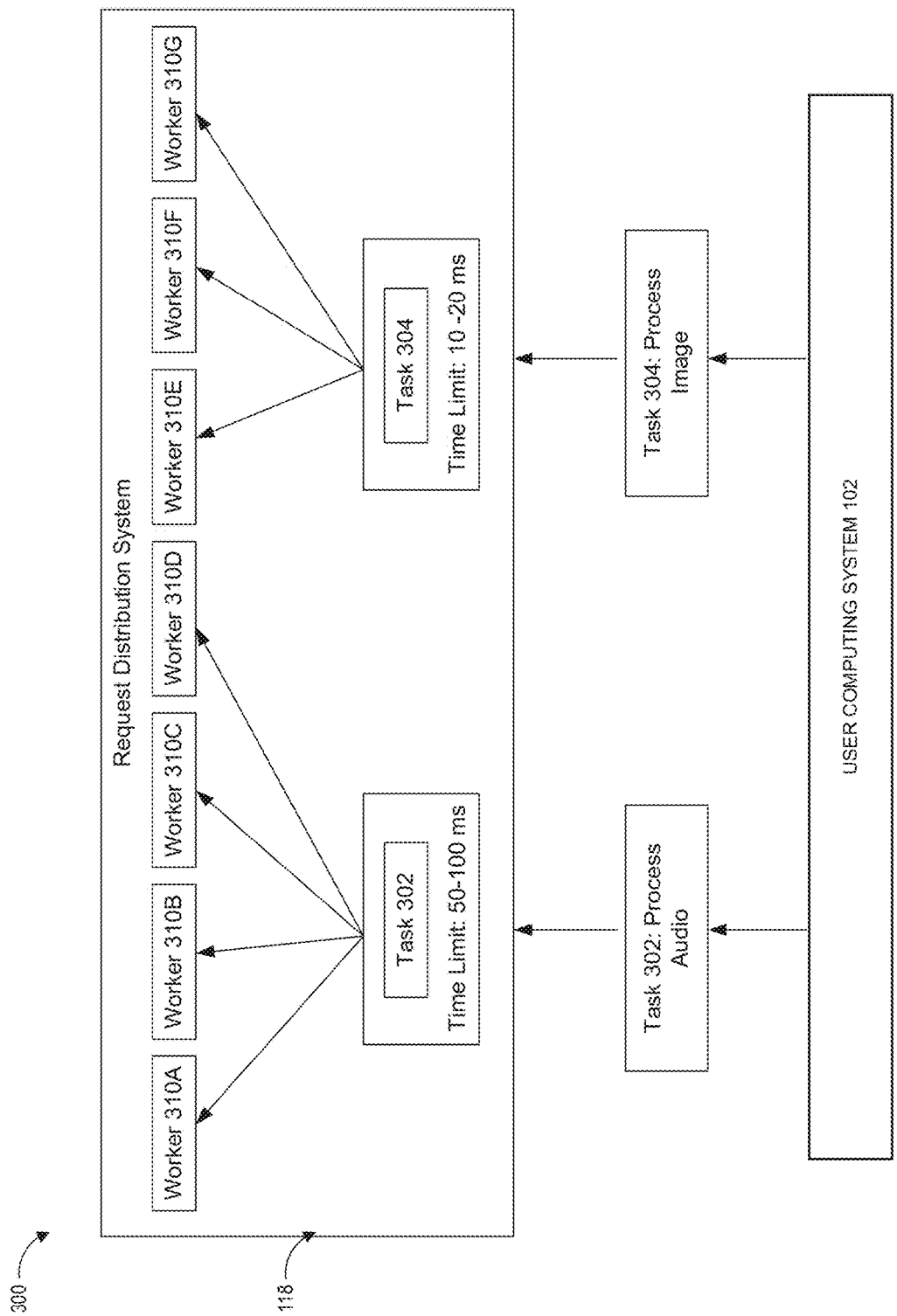
FIG. 3 shows an embodiment of a block diagram of a method for distributing requests for resources to a plurality of workers in a request distribution system.

FIG. 3 shows a block diagram of a method 300 for distributing a request to a plurality of workers, according to one embodiment. The user computing system 102 may transmit requests to the request distribution system 118 for performance of tasks during runtime of a video game application. The video games can comprise online games, multiplayer games, single player games, or any other type of game playable on a console (for example, PlayStation, Xbox, or Nintendo consoles) or a personal computer (PC).

The user computing system 102 may transmit a request to process audio task 302 to request distribution system 118. The user computing system 102 may also transmit a request to process an image task 304 to request distribution system 118. Both task 302 and task 304 may be associated with a time limit. The time limit may have an upper and/or lower boundary. For example, task 302 may be associated with a time limit of 50-100 milliseconds while task 304 may be associated with a time limit of 10-20 milliseconds.

After receiving tasks 302 and 304, the request distribution system 118, through the request manager module 120, may distribute the tasks to a plurality of workers. As discussed above, the request manager module 120 may distribute a particular task to only a subset of all possible workers present in request distribution system 118. In some embodiments, the distribution is based at least partly on the time limit associated with the requests. For example, because task 304 is subject to a 10 milliseconds time constraint, the request distribution system 118 may only select workers 310E, 310F, and 310G to process and execute task 304. In some embodiments, such a distribution may occur because only workers 310E through 310G are specifically configured to process requests within the time constraint of 10 milliseconds. In some embodiments, workers 310E through 310G may be selected to execute task 304 because those workers are specifically configured to handle requests to process images. On the other hand, task 302 may be distributed to workers 310A, 310B, 310C, and 310D due in part because those workers may generate an output within the 100 milliseconds time limit, but not necessarily any earlier. Furthermore, workers 310A through 310D may be specifically configured to execute requests for audio. Tasks 302 and tasks 304 may be transmitted to request distribution system 118 simultaneously or in sequential order. For each task, at least one worker may be selected that is guaranteed to complete the task by the lower time limit. A second worker may be selected that can perform the task less than the upper time limit, but greater than the lower time limit. Although only two tasks are shown in this embodiment, it will be appreciated that any number of tasks may be included in other embodiments.

Process for Responding to a Request

Figure 4:
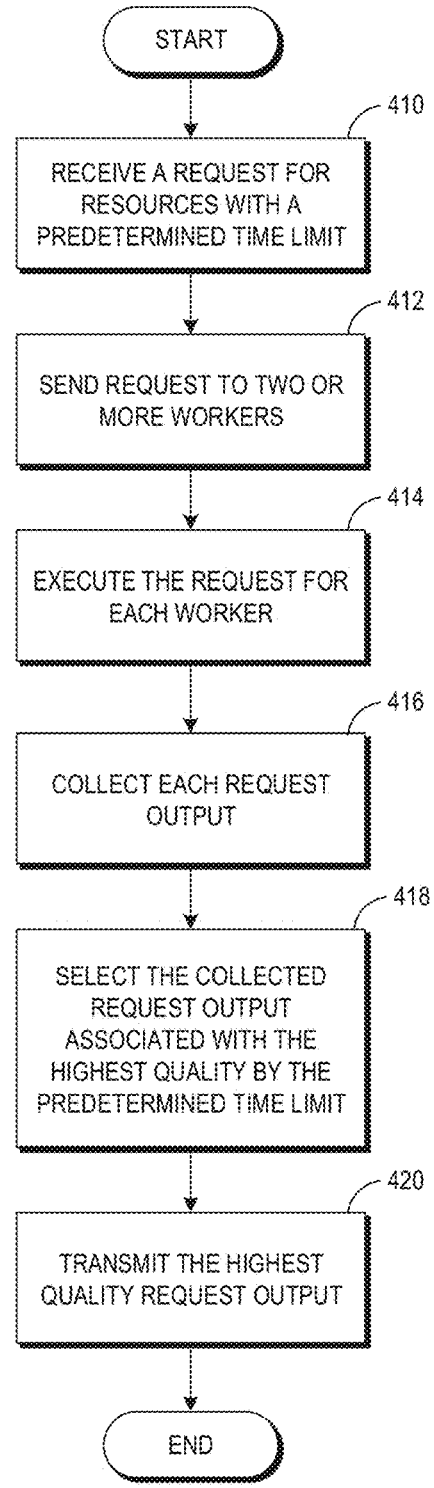
FIG. 4 shows an embodiment of a flow diagram of a method for distributing and executing a request for resources.

FIG. 4 shows a flow diagram of a method for distributing a request to a plurality of workers and generating an output, according to one embodiment. The process 400 can be implemented by any computing system that can respond to processing requests from another computing system and facilitate distribution of the processing request to worker for execution of the request. The process 400, in whole or in part, can be implemented by, for example, a request distribution system 118, one or more works 124A-N, or a user computing system 102, an interactive computing system 130, among others. Although any number of systems, in whole or in part, can implement the process 400, to simplify discussion, the process 300 will be described with respect to particular systems.

In block 410, a system, (for example, a request distribution system 118) can receive a request for resources from a user computing system 102. In some embodiments, the request for resources may be associated with a predetermined time limit. The time limit may have an upper and/or lower boundary or execution threshold. In some embodiments, the predetermined time limit may be based upon a player's actions in a gameplay session. For example, because a player in an action game may destroy a number of computer-controlled enemies within seconds, a user computing system may need to receive instructions to manipulate the remaining computer-controlled enemies within 500 milliseconds in order to provide a challenge to the player. In some embodiments, predetermined time limit may not be based on any user input at all. For example, if a player watching an in-game dialogue sequence may expect character animations and audio to play while the player simply watches the scene. Therefore, the request distribution system 118 may receive a request for audio files, character animations, object rendering, text, or other resources in a strict time frame to ensure a smooth gameplay experience.

At block 412, the request distribution system 118 may send the request to two or more workers. As discussed above, the request distribution system 118 may allocate the requests to only a subset of workers of the total number of workers available to service the request. For example, by utilizing machine learning models stored in scheduling data store 129, the request manager module 120 may learn to transmit specific requests (e.g., requests to process an image within 1 second) to specific workers. In some embodiments, the request manager module 120 may distribute the request to workers it has learned (e.g., by training the machine learning models) are guaranteed to provide an output within the predetermined time frame. The request manager module 120 may also distribute the request to workers that are not guaranteed to provide an output prior to a lower execution threshold. For example, a first worker may guarantee a low-quality image as an output within 10 milliseconds, but a second worker may be able to generate a high-quality image but require 10 to 20 milliseconds to process. The request manager module 120 may transmit the request to the first worker to guarantee at least one low-quality image while also transmitting the request to the second worker if the predetermined time limit is 10 milliseconds because the second worker might output a higher-quality image within the 10 milliseconds time frame.

In block 414, each worker that has been selected to execute the received request may generate a request output. In some embodiments, each request output may be associated with a quality level. For example, a first worker may generate an output associated with a low quality (e.g., a 144-pixel resolution image) while a second worker may generate an output associated with a medium quality (e.g., a 480-pixel resolution image), and a third worker may generate an output associated with a high quality (e.g., a 1080-pixel resolution image).

In block 416, the request distribution system 118 may collect each request output that has been generated by a worker. In some embodiments, the result collector module may receive outputs from each individual worker and temporarily store them until the time limit associated with the request. The request distribution system 118 may collect the results when an indication is received that the request needs to be fulfilled. The indication may be received at any time after a lower execution threshold.

In block 418, the request distribution system 118, through the request collector module, may select the collected request output associated with the highest quality by the predetermined time limit. For example, if the result collector module has collected only two outputs by the time limit, wherein one output is associated with a low quality and the other output is associated with a higher quality, then the result collector module may select the output associated with the higher quality to be transmitted in response to the original request.

Figure 5:
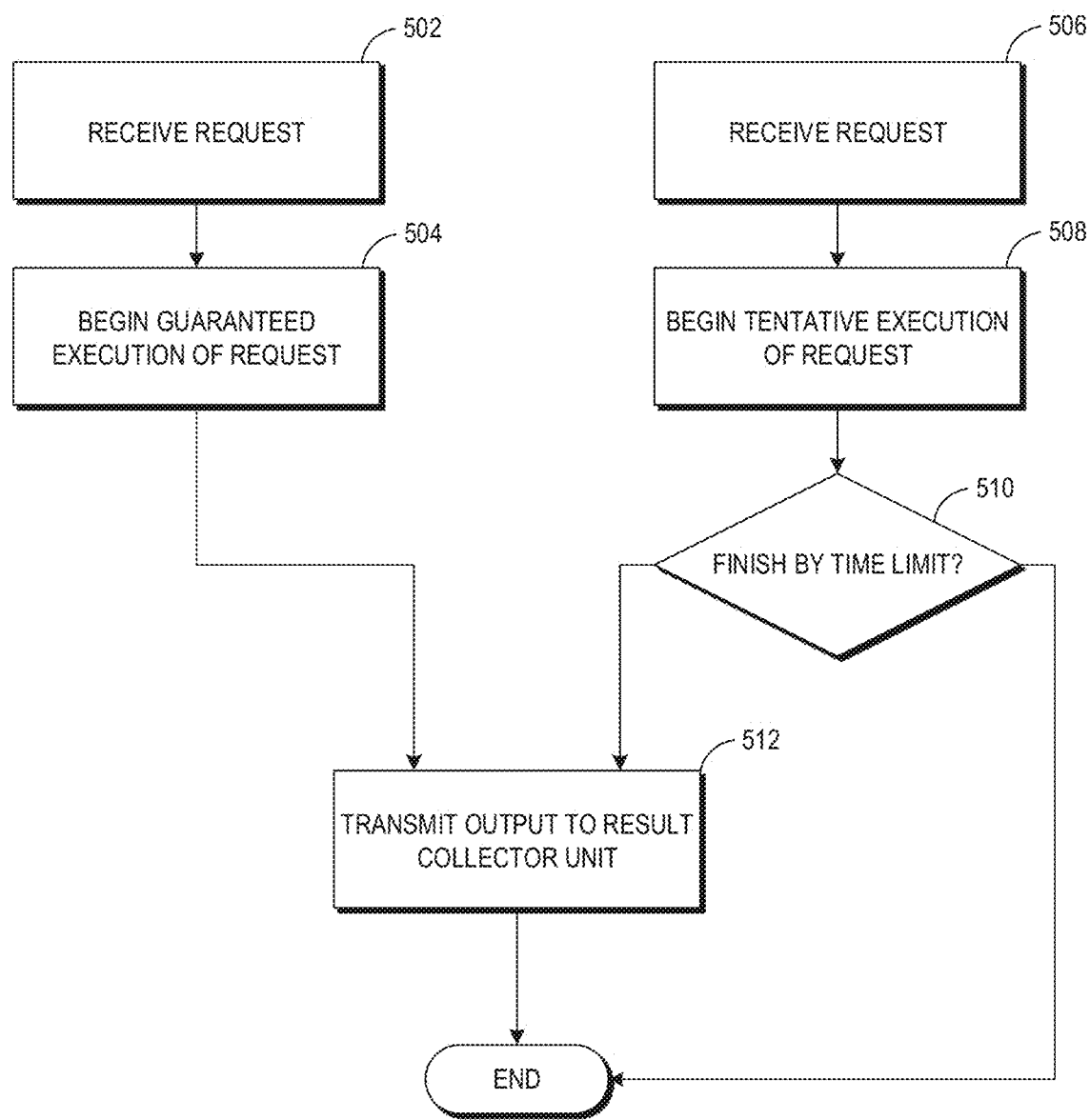
FIG. 5 shows an embodiment of a flow diagram of a method for distributing and executing a request for resources.

In block 420, the result collector module may then transmit the highest quality request output to the local requestor or user computing system in response to the original request. While the result collector module may transmit only one output from the myriad of received outputs, in some embodiments the request distribution system may store information regarding all generated outputs to a log data store. Information such as the quality of the output, the worker that generated the output, the time required to generate the output can be used as historical data to train a machine learning model to understand which workers can generate an output associated with a quality level under given time constraints. In some instances, the output may be requested before one of the workers has completed generating an output for the request Process for Distributing a Request to Workers FIG. 5 shows a flow diagram of a method for distributing a request to a plurality of workers and generating an output, according to one embodiment. The process 500 can be implemented by any computing system that can respond to processing requests from another computing system and facilitate distribution of the processing request to worker for execution of the request. The process 400, in whole or in part, can be implemented by, for example, a request distribution system 118, one or more works 124A-N, or a user computing system 102, an interactive computing system 130, among others. Although any number of systems, in whole or in part, can implement the process 400, to simplify discussion, the process 300 will be described with respect to particular systems.

In block 502, a first worker may receive a request for resources. The first worker can be a worker that is guaranteed to complete the task by a first time limit or a lower time limit associated with the request. The first worker may not be the lowest quality worker that can be selected for the request, but rather the worker that is guaranteed to complete the request by the time limit. The first worker can be selected based in part on a machine learning based request distribution model.

In block 504, the first worker may begin execution of the request. As mentioned above, the first worker may generate a first output associated with a first quality level. For example, the first worker may provide as output an audio clip with high audio quality. Furthermore, based on historical data, it may be known that the first worker has always successfully executed a task given a certain time constraint. For example, based on past executions, there may be historical data indicating that the first worker is guaranteed to generate a lower-quality audio result within the time limit associated with the request.

In block 506, a second worker may receive a request for resources from the request manager module. The second worker can be a worker that may complete the task by a second time limit or an upper time limit associated with the request. The variability between the upper and lower time limits may be based on the game state of the application. Based on the game state, the exact time that the output is needed may vary. The second worker can be configured to generate a higher quality output than the first worker. The second worker can be selected based in part on a machine learning based request distribution model.

At block 508, the second worker may begin execution of the request and generate a second output. In contrast to the first worker in block 606, the second worker may not necessarily generate the second output within a lower time limit. For example, based on historical data, it may be known that the second worker may generate a medium-quality output anywhere between 50 milliseconds to 200 milliseconds of receiving the request.

In block 510, the request distribution system may determine if the execution in block 608 is complete. If the second worker has completed execution of the request by the predetermined time limit, then the second worker may transmit the second output to the result collector module. If the second worker does not successfully generate a second output, then ultimately the first output will be transmitted to a user computing system in response to the request. However, if the second output is successfully transmitted to the result collector module within the predetermined time limit, then the second output may be transmitted over the first output because the second output is associated with a quality level that is higher than the quality level of the first output.

In block 512, the one or more outputs received from the first and/or second worker may be selected for transmission to the result collector module. If the second output, received from the second worker, is completed by the time the request becomes due, it can be provided to the user computing system. Otherwise, the first output generated by the first worker can be provided to the user computing system. It will be appreciated, that is some embodiments, more than two workers are selected to process a request.

Process for Generating Machine Learning Model

Figure 6:
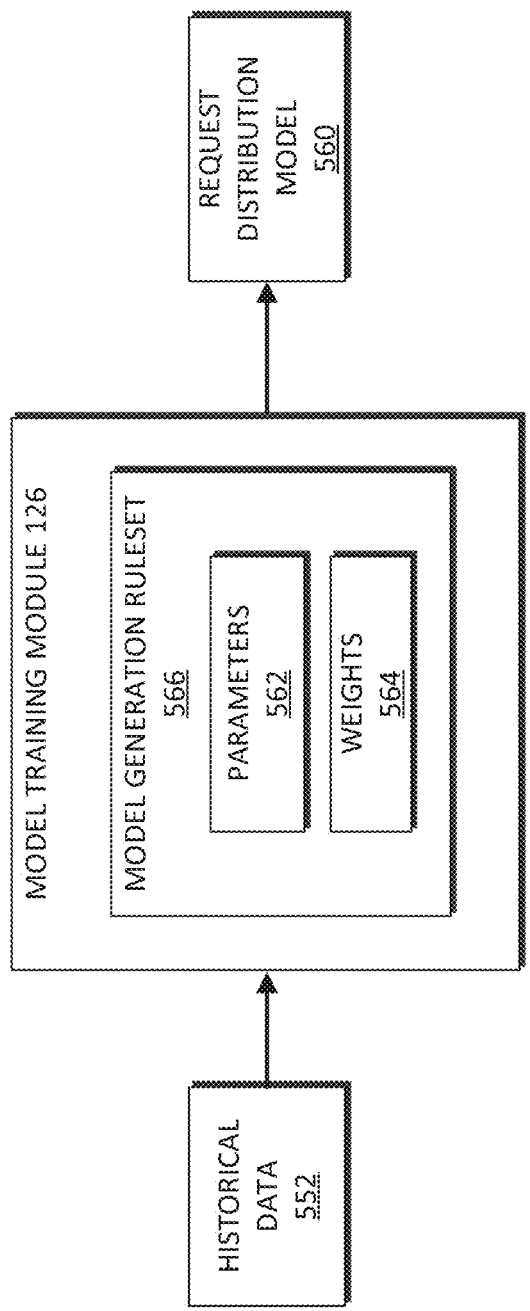
FIG. 6 shows a flow diagram of a method for generating a request distribution model.

FIG. 6 provides block diagram for generating a request distribution prediction model. The model generation system can generate the request distribution model 560 based, at least in part, on historical data. In some embodiments, historical data 552 may comprise log files stored in log data store 128. In some embodiments, historical data 552 may comprise information associated with past requests that have been executed and completed. Historical data 552 may therefore comprise information such as the requested task, the time limit associated with the task, the identity of each worker that executed the task, the identity of each worker that successfully generated an output by the time limit, and a quality level associated with that output. In some embodiments, historical data 552 may also comprise sample data.

The historical data 552 can be used by the model training module 126 to generate and update a model. The model training module 126 can use the type of task or associated time limit as conditions to trigger a different analysis of the data and/or use of a different model. For example, a task that requests a video clip to be generated within 100 milliseconds may trigger the request distribution system to access a machine learning model specifically configured to predict workers that may successfully generate an output within the time frame.

The model training module 126 may generally include a model generation rule set (or "ruleset") 566 for generation of the request distribution model 560. The rule set 566 may include one or more parameters 562. Each set of parameters 562 may be combined using one or more mathematical functions to obtain a parameter function. Further, one or more specific parameters may be weighted by the weights 564. In some cases, the parameter function may be obtained by combining a set of parameters with a respective set of weights 164. The request distribution model 560 and/or the respective parameters 562 of the prediction models 560 may be derived during a training process based on particular input data, such as the historical data 552, and defined output criteria used for training purposes. The model generation rule set 566 can define the specific machine learning rules and/or algorithms the model training module 526 uses to generate the model based on a defined objective function, such as predicting which workers may successfully generate an output given a type of request and time constraint. In some embodiments, initial parameters 562 and weights 564 can be manually provided during the initiation of the model generation process. In some embodiments, unsupervised machine learning techniques can be used to determine the initial parameters 562 and weights 564 based on the historical data 552. The parameters 562 and weights can be updated and modified during the model generation phase to generate the request distribution model 560.

The model training module 126 can filter and categorize the data sets according to various characteristics and parameters of the data. For example, the data can be categorized by the request type (such as, for example, requests for audio, video, text, character behavior, object generation, etc.), output source (such as, for example, the workers), time limit (such as, for example, 1 second or less), time taken to generate an output, or other categories associated with the data. In some embodiments, the model training module 126 is configured to filter and separate the data sets into defined data tables comprising a plurality of data sets before further processing.

The model training module 126 can identify information associated with the data that is relevant to identifying patterns and trends. The request distribution model 560 can be configured to detect whether variations in a data set exceed an expected deviation. The request distribution model 560 can be configured to rate or score the variations in the data. In some embodiments, the model training module 126 can generate a plurality of request distribution models 560. Each request distribution model 560 can be used based on specified criteria, such as different request types or time limits. In some embodiments, the request distribution system may be configured to dynamically feed new log file information back into the model generation system to update the request distribution model. The model 560 may be updated in the background after the information is received.

After the request distribution model 560 has been generated, the model can be used during runtime of the request distribution system for real-time selection of workers after a request is received with a time limit. For example, the request distribution model 560 may be capable of allocating requests to workers shortly after receiving the request.

Overview of Computing Device

Figure 7:
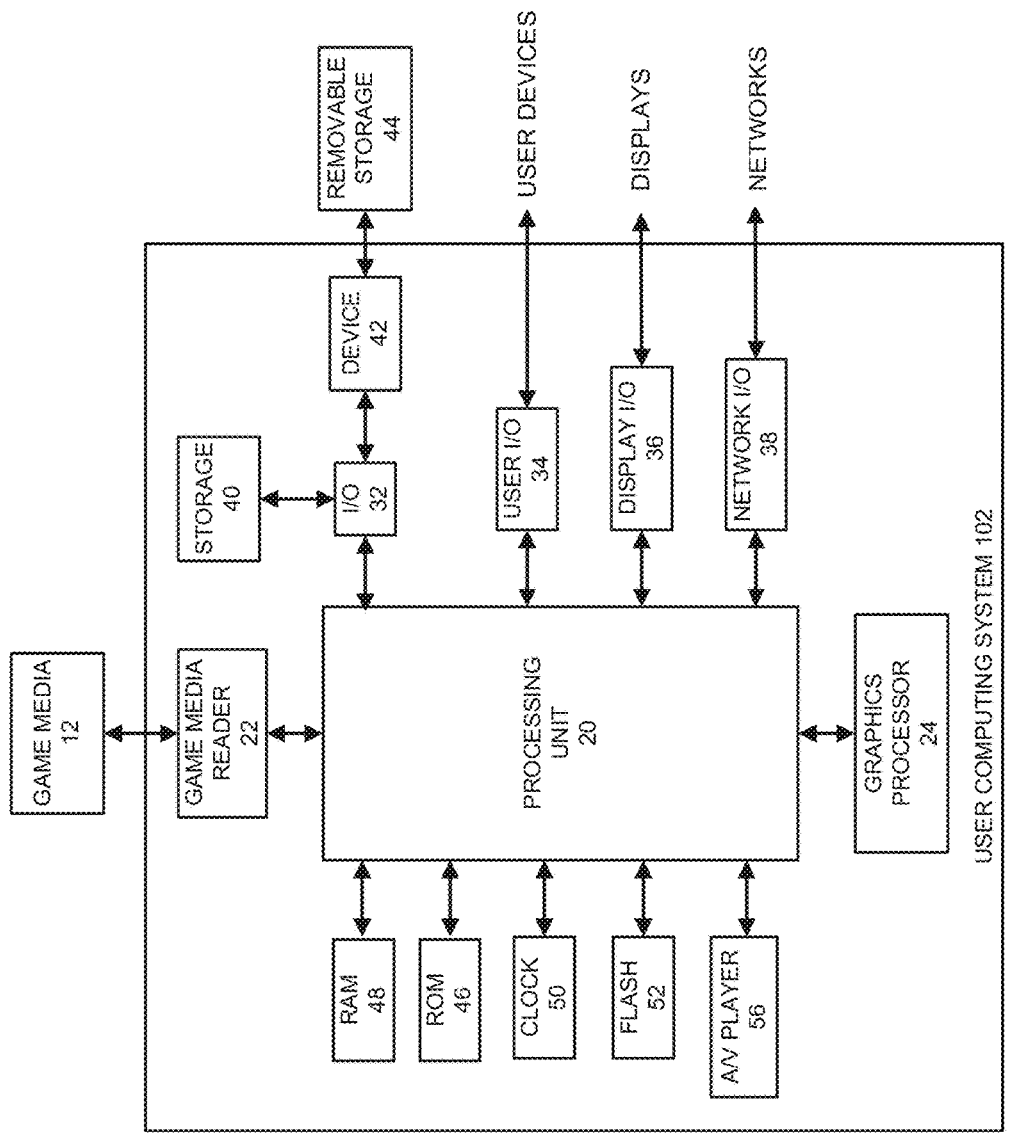
FIG. 7 illustrates an embodiment of a computing system configured to implement the request distribution system.

FIG. 7 illustrates an embodiment of computing device 10 according to the present disclosure. Other variations of the computing device 10 may be substituted for the examples explicitly presented herein, such as removing or adding components to the computing device 10. The computing device 10 may include a game device, a smart phone, a tablet, a personal computer, a laptop, a smart television, a car console display, a server, and the like. As shown, the computing device 10 includes a processing unit 20 that interacts with other components of the computing device 10 and also external components to computing device 10. A media reader 22 is included that communicates with media 12. The media reader 22 may be an optical disc reader capable of reading optical discs, such as CD-ROM or DVDs, or any other type of reader that can receive and read data from game media 12. One or more of the computing devices may be used to implement one or more of the systems disclosed herein.

Computing device 10 may include a separate graphics processor 24. In some cases, the graphics processor 24 may be built into the processing unit 20. In some such cases, the graphics processor 24 may share Random Access Memory (RAM) with the processing unit 20. Alternatively, or in addition, the computing device 10 may include a discrete graphics processor 24 that is separate from the processing unit 20. In some such cases, the graphics processor 24 may have separate RAM from the processing unit 20. Computing device 10 might be a handheld video game device, a dedicated game console computing system, a general-purpose laptop or desktop computer, a smart phone, a tablet, a car console, or other suitable system.

Computing device 10 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 10. Processing unit 20 can communicate through I/O 32 to store data, such as game state data and any shared data files. In addition to storage 40 and removable storage media 44, computing device 10 is also shown including ROM (Read-Only Memory) 46 and RAM 48. RAM 48 may be used for data that is accessed frequently.

User I/O 34 is used to send and receive commands between processing unit 20 and user devices, such as game controllers. In some embodiments, the user I/O can include a touchscreen inputs. The touchscreen can be capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game.

Display output signals produced by display I/O 36 comprising signals for displaying visual content produced by computing device 10 on a display device, such as graphics, user interfaces, video, and/or other visual content. Computing device 10 may comprise one or more integrated displays configured to receive display output signals produced by display I/O 36. According to some embodiments, display output signals produced by display I/O 36 may also be output to one or more display devices external to computing device 10, such a display 16.

The computing device 10 can also include other features that may be used with a game, such as a clock 50, flash memory 52, and other components. An audio/video player 56 might also be used to play a video sequence, such as a movie. It should be understood that other components may be provided in computing device 10 and that a person skilled in the art will appreciate other variations of computing device 10.

Program code can be stored in ROM 46, RAM 48 or storage 40 (which might comprise hard disk, other magnetic storage, optical storage, other non-volatile storage or a combination or variation of these). Part of the program code can be stored in ROM that is programmable (ROM, PROM, EPROM, EEPROM, and so forth), part of the program code can be stored in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing device 10 is turned off or loses power.

As computing device 10 reads media 12 and provides an application, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A request distribution system comprising:
one or more data stores configured to store at least:
one or more machine learning models configured to select workers for execution of a defined task; and
one or more physical computer processors in communication with the one or more data stores, wherein computer-executable instructions, when executed during runtime of a gameplay session of a game application, configure the one or more physical computer processors to:
receive a first task associated with at least a first time threshold during runtime of the gameplay session the game application;
identifying a first plurality of workers configured to execute the first task within the first time threshold based, at least in part, on the one or more machine learning models, wherein each worker in the first plurality of workers is configured to generate a different output in response to the first task, wherein each worker has a different defined output quality level relative to other workers assigned to the first task;
distribute the first task to each worker in the first plurality of workers;
by each worker in the first plurality of workers, process the first task in order to generate an output specific to the associated worker with the defined output quality level of the associated worker during the first time threshold;
at a first execution time, receive an indication to provide an output to the first task;
select an output completed by one of the plurality of workers with the highest output quality level at the first execution time; and
transmit the selected worker output to the game application during runtime of the gameplay session.

2. The system of claim 1, wherein at least one worker of the plurality of workers is configured to generate an output at or before the first time threshold.

3. The system of claim 1, wherein at least one worker of the plurality of workers is configured to generate an output after the first time threshold.

4. The system of claim 1, wherein the one or more data stores are configured to store a log file comprising a past request for computing resources, a past time limit associated with the past request, one or more workers from a plurality of workers associated with the past request, and a past worker output for each of the one or more workers.

5. The system of claim 4, the computer-executable instructions further configure the one or more processors to generate a first log file comprising a first request, the first plurality of workers configured to execute the first request within the first time threshold, and the first worker output for each worker in the first plurality of workers.

6. The system of claim 5, wherein the machine learning models are trained based at least on the first log file.

7. The system of claim 1, wherein the first execution time is based at least in part on a game state of the gameplay session.

8. The system of claim 1, wherein the first execution time is at or after the first threshold time.

9. The system of claim 1, wherein a first request comprises a second time threshold, wherein the second time threshold is longer than the first time threshold.

10. The system of claim 1, wherein each of the first plurality of workers are heterogeneous workers.

11. A request distribution method comprising:
receiving a first task associated with at least a first time threshold during runtime of a gameplay session of a game application;
identifying a first plurality of workers configured to execute the first task within the first time threshold based, at least in part, on one or more machine learning models, wherein each worker in the first plurality of workers is configured to generate a different output in response to the first task, wherein each worker has a different defined output quality level relative to other workers assigned to the first task;
distributing the first task to each worker in the first plurality of workers;
by each worker in the first plurality of workers, process the first task in order to generate an output specific to the associated worker with the defined output quality level of the associated worker during the first time limit;
at a first execution time, receiving an indication to provide an output to the first task;
selecting an output completed by one of the plurality of workers associated with the highest output quality level at the first execution time; and
transmitting the selected worker output to the game application during runtime of the gameplay session.

12. The method of claim 11, further comprising:
receiving a second task with a second time threshold;
identifying a second plurality of workers configured to execute the second task, wherein a type of the second task is different than a type of first task; and
distributing the second task to each worker in the second plurality of workers.

13. The method of claim 11, wherein the first task comprises a request for generation of at least one of an audio output, a video output, an image, text, or a calculation.

14. The method of claim 11, wherein the first plurality of workers comprises at least one worker that is configured to generate the output within the first time threshold.

15. The method of claim 11, wherein the first plurality of workers is identified based at least partly on the first time threshold.

16. The method of claim 11, wherein the first task is transmitted to each worker in the first plurality of workers simultaneously.

17. The method of claim 11, wherein each worker in the first plurality generates the output in parallel with each other worker in the first plurality.

18. The method of claim 11, wherein the first time threshold is based at least in part on a complexity level associated with the first task.

19. The method of claim 11, wherein the first execution time is based at least in part on a game state of the gameplay session.

20. The method of claim 11, wherein the first execution time is at or after the first threshold time.

\* \* \* \* \*